Patented Dec. 4, 1945

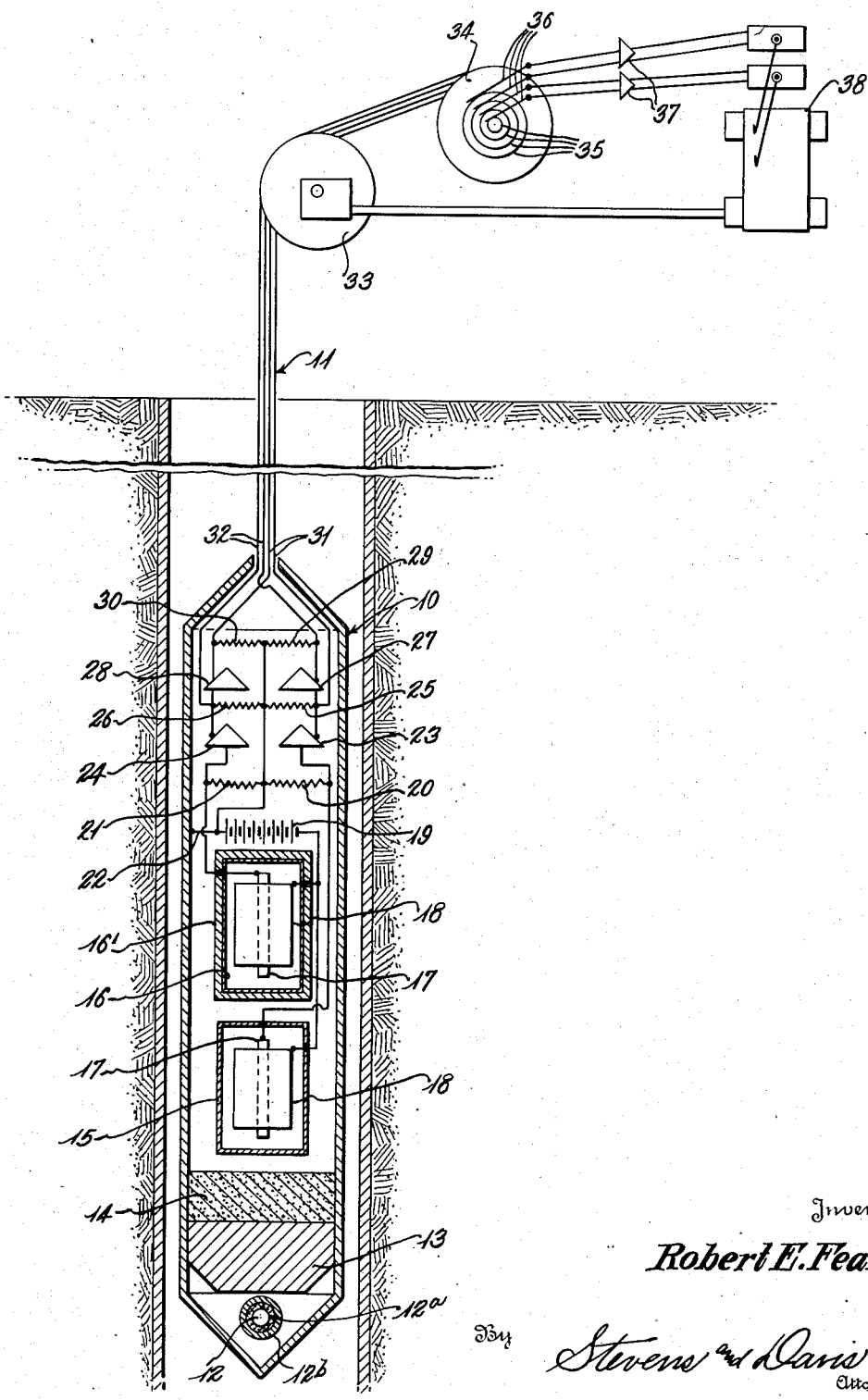

2,390,433

UNITED STATES PATENT OFFICE 2,390,433

WELL SURVEY METHOD AND APPARATUS

Robert Earl Fearon, Tulsa, Okla., assignor to Well Surveys, Incorporated, Tulsa, Okla., a corporation of Delaware Continuation of application Serial No. 325,880, March 25, 1940. This application July 29, 1944, Serial No. 547,153

17 Claims. (Cl. 250—83.6)

This invention relates to geophysical prospecting and more particularly to a method and apparatus for determining the nature of formations lying adjacent to openings extending downwardly into the earth such for example as the drill holes made to obtain oil.

This application is a continuation of applicant's pending application, Serial Number 325,-880, filed March 25, 1940, for Well survey method and apparatus.

Surface prospecting, that is the determination of the nature of geological formations lying on or close to the surface of the earth does not present the same problems as are presented by attempts to determine the nature of subsurface strata, for the surface strata are relatively available and can be sampled and observed without great difficulty. Therefore, although the principles of the present invention may be applied to surface prospecting or applied to the examination of samples either obtained on the surface or by core sampling during the drilling process, the present invention is more particularly adapted to the geophysical exploration of subsurface strata in situ, that is by the examination of the strata without moving it from its original, relatively inaccessible location far below the surface of the earth.

Numerous methods and devices have been proposed for determining the nature of subsurface strata without actually sampling it and many of the proposed devices have been adapted to be lowered into drill holes to measure characteristics of the strata from positions adjacent thereto in the bore holes. Among the methods and devices that operate in this manner have been devices which measure the natural radioactivity of the strata adjacent the drill hole at various depths. Devices have also been proposed for exposing the surrounding strata to primary radiations which in turn induce secondary radiations in the surrounding strata or are scattered and returned to the drill hole so that measurements can be made of the secondary or scattered radiations.

Up to the present time the nature of the scattered or induced radiations has apparently not been considered in any great detail and no attempt has been made to do more than suggest the measurement of their intensities. It has now been discovered that the measurement of the quality or kind of radiations that return to the drill hole under certain stimuli or from natural causes, can be made and that these measurements will yield information not heretofore readily obtainable about the surrounding strata.

Assuming for the moment that the necessary measurements can be made, let us assume that a formation is bombarded by neutrons. In such a case, aside from the natural radiations emanating from the formation, there will be a certain intensity of neutrons that are scattered by the formation and reach whatever measuring instrument is used. This scattering of neutrons is a ballistic process in which the neutrons, which are actual particles moving in relatively high speeds, simply bounce off of the atoms of the formation.

In addition to the scattering of the neutrons, however, there is a second phenomenon that occurs, namely the absorption of a certain proportion of the neutrons by the molecules of the formation. When neutrons are absorbed a certain amount of energy is given off in the form of gamma radiations and a portion of these gamma radiations, as well as a portion of the scattered neutrons, will reach the detecting instrument.

In the case of the scattering of the neutrons, the phenomenon being caused largely by the collision between neutrons and atoms, the scattering will be more closely related to a gross physical characteristic like density than to the more specific nuclear characteristics of the formation. In the case of the gamma ray generation, however, the absorption of the neutrons in atoms of the formation and emission of gamma rays will depend to a much larger extent upon the specific chemical nature of the atoms making up the formation and hence a measure of the gamma rays generated will be more a measure of the chemical nature of the formation.

In order to embody the above concepts in a device and method that would be usable for practical purposes in actual field surveying operations, an apparatus has been devised which consists of a relatively large metal casing or capsule of tubular shape adapted to be lowered into a drill hole and suspended therein by means of a cable carrying the necessary electrical conductors to connect measuring instruments which are carried therein to the recording instruments which are maintained on the surface of the ground.

Within the capsule is positioned a source of neutrons which will radiate neutrons into the strata surrounding the drill hole so as to cause the desired emission of neutrons and gamma rays therefrom. Also within the capsule is positioned a detector of gamma rays and a detector of neutrons, both carefully shielded from the primary source of neutrons so that neutrons emitted therefrom cannot directly effect them.

In the usual embodiment the measuring instrument consists of a pair of ionization chambers differently shielded and having the same or different kinds of gas therein at the same or different pressures so that one of the ionization chambers is more sensitive to neutrons than to gamma rays and the other ionization chamber is more sensitive to gamma rays. With such instruments, even though neither will measure its own type of rays to the entire exclusion of the other, a measure of each type of radiations can be made by properly combining the outputs of the two ionization chambers. Thus, if we make A=the measurement made by the ionization chamber more sensitive to gamma rays, H=the measurement made by the ionization chamber more sensitive to neutrons, N=the measurement that the neutrons alone would produce in the chamber more sensitive to them and $j$=the measurement that the gamma rays would produce in the chamber more sensitive to them, then $$N = kH - kK'A$$
$$j = KA - KK''H$$

where $k$, K, K' and K'' are constants. Thus by properly amplifying and combining the measurements made by the pair of ionization chambers it has been discovered that accurate measurements of the two types of radiations can be made.

A consideration of the accompanying drawing and the following detailed description of the preferred embodiment of this invention will reveal many additional details of the method and apparatus by which it may be practically applied and also serve to show additional advantages for their use.

The single figure of the drawing is a diagrammatic illustration of the preferred form of this invention.

As illustrated, the preferred embodiment of this invention consists of a main container or capsule 10 adapted to be lowered into a drill hole at the end of a supporting cable 11 which carries insulated electrical conductors of a sufficient number to transmit the results of the measurements made to the surface. Within the capsule 10, generally near the bottom thereof, is positioned a source 12 of neutrons.

Any known source of neutrons may be used for this purpose as for example a mixture of radon and beryllium powder or radon and boron powder or mesothorium and heavy water or radiothorium and heavy water. The latter two neutron sources produce neutrons of a slower type which is often desirable because they are more readily absorbed and produce a larger proportion of gamma rays from the surrounding strata. When the source of faster neutrons is employed the neutrons may be slowed down by enclosing the neutron producing source with an hydrogenaceous material such as paraffin 12a. The thickness of this surrounding layer can be adjusted to slow down the average speed of the emitted neutrons without completely preventing their emission into the surrounding strata. A lead shield 12b around said primary source of neutrons and hydrogenaceous material to prevent the emission of gamma rays is also desirable since it eliminates gamma rays that would otherwise be scattered or reflected and recorded. The paraffin and the lead shield should each be about 4 centimeters or more in thickness.

Between the primary source of neutrons 12 and the measuring instruments are positioned a block of lead 13 and a block of hydrogenaceous material 14 of sufficient thickness to strongly shield the measuring instrument both from any gamma radiations and from any neutrons that start towards the measuring instruments from the primary sources of radiation. Paraffin has been found to be satisfactory as the hydrogenaceous material for this purpose and three or four centimeters each of paraffin and lead make a very satisfactory shield by acting to considerably suppress neutrons and any stray gamma rays. The order in which they are placed above the primary source of radiation is not important.

On the opposite side of the sheld from the primary source of radiation and within the capsule 10 are two ionization chambers 15 and 16, the ionization chamber 15 being designed to be more responsive to gamma radiations and the ionization chamber 16 being designed to be more responsive to neutrons. To effect this defference in responsiveness the ionization chamber 15 is preferably filled with argon at around 1350 pounds per square inch pressure and is practically unshielded, that is the sheath is only thick enough to prevent the entrance of the alpha and beta rays. The ionization chamber 16, on the other hand, preferably contains hydrogen at around 900 pounds per square inch pressure and is shielded quite heavily by a lead outer casing 16' 4 or 5 centimeters in thickness. Each ionization chamber contains an inner electrode 17 and an outer electrode 18, the inner electrode being in the shape of a cylindrical rod about 6 inches long and the outer electrode being in the shape of a cylindrical sheet iron shell about two inches in diameter, surrounding and spaced from the inner electrode. The outer electrodes are connected to the negative side of a battery 19 or other source of potential and the inner electrodes 17 are connected to the positive side of the battery through separate resistors 20 and 21, respectively. The positive side of the battery is preferably grounded through a connection 22 to the casing 10.

The resistors 20 and 21 will preferably have resistances of the order of $10^{12}$ ohms and the respective potentials developed across them will vary in direct relation to the currents which the impinging radiations cause to flow in the ionization chambers 15 and 16. Across each of the resistors 20 and 21 is placed an amplifier, 23 and 24 respectively, each serving to multiply the measurement indicated by the potential drop across the resistor to which it is connected by a constant factor which corresponds to K in the formulas previously given. For convenience in this instance the circuit elements are adjusted whereby the constant $k$ is equal to K. Across the output of each of the amplifiers 23 and 24 is a resistor, 25 and 26 respectively. Since the original voltage developed across resistor 20 corresponds to A in the formulas previously given the voltage across the resistor 25 will correspond to KA in the formulas and the voltage across resistor 26, since that across resistor 21 corresponded to H in the formulas, will correspond to KH. A second pair of amplifiers, 27 and 28, are connected across resistors 25 and 26 respectively, amplifier 27 multiplying the measurement indicated by the voltage across resistor 25 by a factor corresponding to the constant K' in the formula and amplifier 28 multiplying the measurement indicated by the voltage across resistance 26 by a factor corresponding to K'' in the formula. Resistances 29 and 30, respectively, are then placed across the outputs of amplifiers 27 and 28 and the voltages developed thereacross correspond to AKK' and HKK'' respectively. By means of a pair of leads 31 extending from one end of the resistor 30 which develops a potential corresponding to HKK'' and from the opposite end of the resistor 25 which develops a voltage corresponding to AK, a voltage is obtained which corresponds to the formula AK—HKK'' or to $j$ which is the gamma ray intensity. Similarly by use of a pair of leads 32 connected to one end of the resistor 26 which develops a voltage corresponding to HK and to the opposite end of the resistor 29 which develops a voltage corresponding to AKK' there is obtained a voltage corresponding to HK—AKK' or $n$, which is the neutron intensity as measured in ionization chamber 16.

The currents so obtained are carried to the surface through the cable 11 over a measuring wheel 33 and on to the cable reel 34. From the cable reel they are taken through slip rings 35 and brushes 36, amplified if necessary by further amplifiers 37 and recorded side by side on a recorder 38. This recorder is driven by suitable gearing 39 or by an electrical transmission system such as a Selsyn transmission system from the measuring wheel 33 so that the movement of the recorder tape corresponds to the movement of the measuring capsule up and down in the drill hole. Thus the record made correlates the record of the measurements made with a record of the depths at which the measurements were taken.

Obviously, a very considerable number of modifications in the apparatus and method described may be made within the scope of the present invention by those skilled in the art. For example, the primary source of radioactivity may be omitted and the measurements made only of natural radioactivity. Alternatively, measurements may be made both with and without the primary source of radioactivity and the measurements compared to give a measurement of induced or scattered radioactivity apart from any measurement of natural radioactivity. Further the design or shielding of the ionization chambers may be varied and the various amplifying units may be positioned on the surface rather than in the main casing 10. Still further, the measuring currents may be commutated and transmitted to the surface as alternating currents as disclosed in patent application Serial Number 279,577 filed June 16, 1939, by Serge A. Scherbatskoy, or a null system of measurement may be used such as described in patent application Serial Number 299,767 filed October 16, 1939, by Serge A. Scherbatskoy. As another modification the lag in measurements caused by the capacity of the ionization chambers may be overcome by the application of the principles of the invention disclosed in this inventor's application Serial Number 311,217 filed December 27, 1939. Also, the power for operating the device and the currents indicating the results of the measurements may be transmitted from and to the surface by means of a plurality of carrier frequencies travelling over a single conductor as described in this inventor's application Serial Number 311,219 filed December 27, 1939. Any or all of these modifications and numerous others that will readily occur to those skilled in the art are contemplated as a part of this invention.

The constants designated K, K' and K" may be established and the amplifiers set to give the desired degree of amplification by laboratory operation of the device under controlled conditions of exposure to neutrons and gamma rays. In making these adjustments the resistors 20, 21, 25, 26, 29 and 30 may be adjusted as necessary as well as the amplifiers themselves and the voltages impressed across the ionization chambers may be adjusted and may be made different from each other as necessary. The type and pressure of the gases in the ionization chambers and their shielding is also subject to variation to fit the instrument for the particular type of measurements that it may be desired to make. All this is contemplated and believed well within the skill of those familiar with this art. Obviously, a measurement may be made of gamma rays or of neutrons alone and it is not necessary to make both measurements at the same time although this has been found highly desirable.

I claim:

1. A method of geophysical prospecting that comprises at various levels from a well bore or other opening in the earth bombarding the adjacent strata with neutrons, simultaneously at substantially the same level separately measuring the gamma rays and neutrons returning to the well bore from the strata, simultaneously determining the depths at which said measurements are made and recording said measurements in correlation with said determinations of depth.

2. A method of geophysical prospecting that comprises at various levels from a well bore or other opening in the earth bombarding the adjacent strata with slow neutrons, simultaneously at substantially the same level, separately measuring the gamma rays and neutrons returning to the well bore from the strata, simultaneously determining the depths at which said measurements are made and recording said measurements in correlation with said determinations of depth.

3. A method of geophysical prospecting that comprises, from a continuously varying depth in a drill hole or other opening in the earth, bombarding the adjacent strata with neutrons while simultaneously and at the same depth separately measuring the neutrons and gamma rays returning to said bore hole or opening in the earth, continuously determining the depth at which the measuring is being done and continuously recording the measurements in correlation with the determination of depth.

4. An apparatus for geophysical prospecting that comprises a sealed chamber adapted to be lowered into a drill hole or other opening in the earth, and, contained within said chamber, a primary source of neutrons, a detector for gamma rays, a detector for neutrons, and a shield between said primary source of neutrons and said detecting instruments for preventing the direct emission from said primary source from reaching said detecting means.

5. An apparatus for geophysical prospecting that comprises a sealed chamber adapted to be lowered into a drill hole or other opening in the earth and, containing therein, a primary source of neutrons, a detector for gamma rays, a detector for neutrons, a shield between said primary source of neutrons and said detecting instruments for preventing the direct emission from said primary source from reaching said detecting means and means for amplifying the outputs of said detecting means and transmitting said outputs to the surface for recording.

6. An apparatus for geophysical prospecting that comprises a pair of ionization chambers one of which is relatively more responsive to gamma rays and the other of which is relatively more responsive to neutrons, interconnected amplifying means for said two ionization chambers so connected as to amplify the measurements made thereby and at the same time to correct the measurement made by the neutron sensitive chamber so as to substantially exclude any error due to the effect of gamma rays on said chamber and to correct the measurement made by the gamma ray sensitive chamber to eliminate the effect of neutrons on this measurement.

7. An apparatus for geophysical prospecting that comprises a sealed capsule adapted to be lowered into an opening in the earth, a primary source of neutrons in said capsule, hydrogenaceous material surrounding said primary source of neutrons to lower their speed, a shield also surrounding said primary source of neutrons to substantially prevent the emission of gamma rays, a pair of ionization chambers in said capsule, one more sensitive to gamma rays and the other more sensitive to neutrons, a shield between said primary source of radiations and said ionization chambers sufficient to prevent direct radiations from said primary source from reaching said ionization chambers, a source of electrical potential one terminal of which is connected to an electrode of each of said ionization chambers, two primary resistors, one connected to the other electrode of each of said ionization chambers and having its opposite end connected to the opposite terminal of said source of potential, two primary amplifiers, one having its input connected across each of said resistors, two secondary resistors, one connected across the output of each of said primary amplifiers, two secondary amplifiers, one having its input connected across each of said secondary resistors, two tertiary resistors, one connected across the output of each of said secondary amplifiers, the arrangement being such that the secondary resistor for one amplifier set is connected in series with the tertiary resistor for the other amplifier set so that differential voltages may be taken from the circuit representing the difference between the output of the primary amplifier for one of the primary resistors and the output of the secondary amplifier for the other primary resistor and vice versa, a cable for supporting the capsule in the well and conveying these currents to the surface, a recorder, for recording said currents and means for driving said recorder in accordance with the motions of the cable up and down in the well bore or other opening.

8. A method of geophysical exploration that comprises exposing a subterranean formation to a primary neutron source whereby a stream of neutrons bombards said formations, making a measurement that is predominantly influenced by secondary neutron emission of the formation to be studied, making a second measurement that is predominantly influenced by gamma ray emission of the formation to be studied and combining said measurements to give a measurement more accurately indicative of the neutron emission of said formation than the original measurement.

9. A method of geophysical exploration that comprises exposing a formation to bombardment by a primary stream of neutrons, making a measurement that is predominantly influenced by the secondary neutron emission of the formation to be studied, making a second measurement that is predominantly influenced by gamma ray emission of the formation to be studied and combining said measurements to give two measurements one more accurately indicative of neutron emission of said formation than the first measurement and the other more accurately indicative of the gamma ray emission of said formation than the said first measurement.

10. A method of geophysical exporation that comprises at various levels from a well bore or other opening in the earth bombarding adjacent strata with a primary stream of neutrons, simultaneously at substantially the same level separately measuring gamma rays and secondary neutron streams returning to the well bore from the strata, simultaneously determining the depths at which said measurements are made and recording said measurements in correlation with the determinations of depth.

11. Method of geophysical prospecting that comprises bombarding a geological formation with neutrons and simultaneously but separately measuring secondary neutron and gamma ray emission of the formation as an index of its nature.

12. Method of geophysical prospecting that comprises bombarding a geological formation with neutrons, simultaneously but separately measuring secondary neutron and gamma ray emission of the formation as an index of its nature and recording the measurements in correlation with indications of the place of measurement.

13. A method of geophysical prospecting that comprises at various levels from a cased well bore or other metal sheathed earth opening bombarding the adjacent strata with neutrons, simultaneously at substantially the same level separately measuring the gamma rays and neutrons returning to the well bore from the strata, simultaneously determining the depths at which said measurements are made and recording said measurements in correlation with said determinations of depth.

14. A method of geophysical prospecting that comprises at various levels from a cased well bore or other metal sheathed earth opening bombarding the adjacent strata with slow neutrons, simultaneously at substantially the same level, separately measuring the gamma rays and neutrons returning to the well bore from the strata, simultaneously determining the depths at which said measurements are made and recording said measurements in correlation with said determinations of depth.

15. A method of geophysical prospecting that comprises, from a continuously varying depth in a cased drill hole or other sheathed opening in the earth, bombarding the adjacent strata with neutrons while simultaneously and at the same depth separately measuring the neutrons and gamma rays returning to said bore hole or opening in the earth, continuously determining the depth at which the measuring is being done and continuously recording the measurements in correlation with the determinations of depth.

16. A method of geophysical prospecting that comprises at various levels from a well bore or other opening in the earth bombarding the adjacent strata with radiation which will produce nuclear disintegration therein, simultaneously at the same level separately measuring two different types of radiation, said radiations having different penetrating characteristics returning to the well bore from the strata and resulting from said nuclear disintegration, simultaneously determining the depths at which said measurements are made and recording said measurements in correlation with said determinations of depth.

17. A method of geophysical prospecting that comprises at various levels from a well bore or other opening in the earth bombarding the adjacent strata with neutrons which will produce nuclear disintegration therein, simultaneously at the same level separately measuring two different types of radiation, said radiations having different penetrating characteristics returning to the well bore from the strata and resulting from said nuclear disintegration, simultaneously determining the depths at which said measurements are made and recording said measurements in correlation with said determinations of depth.

ROBERT EARL FEARON.